March 7, 1961    E. H. ODDSON    2,973,971
COUPLING AND ALIGNMENT MECHANISM
Filed Nov. 24, 1958
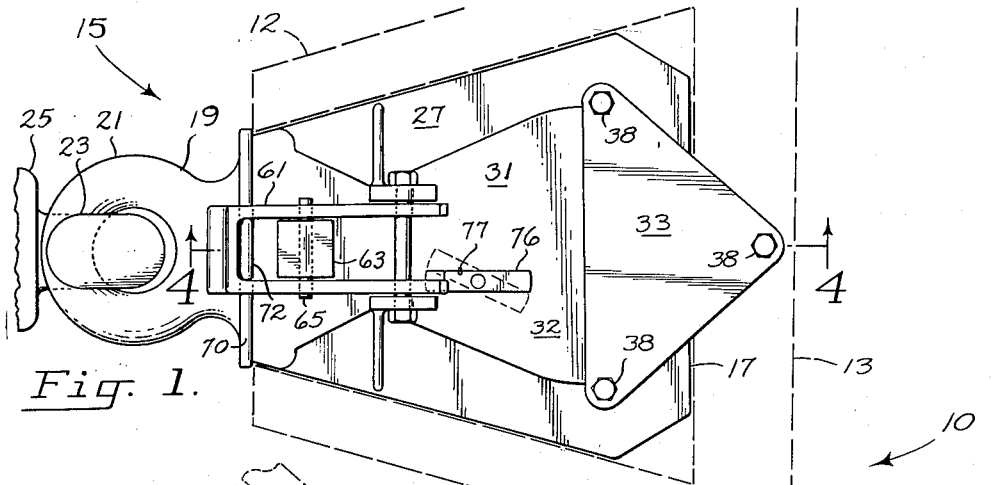
Fig. 1.
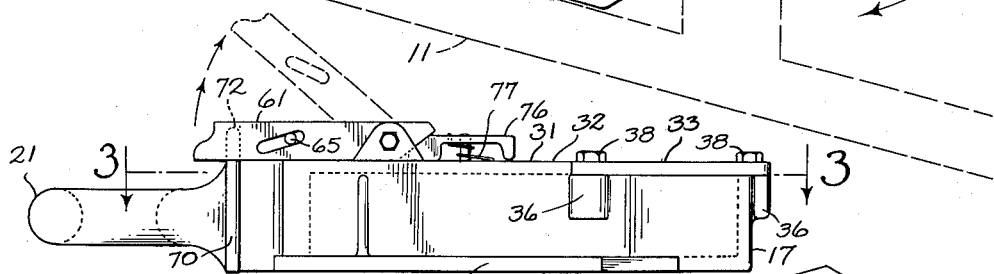
Fig. 2.
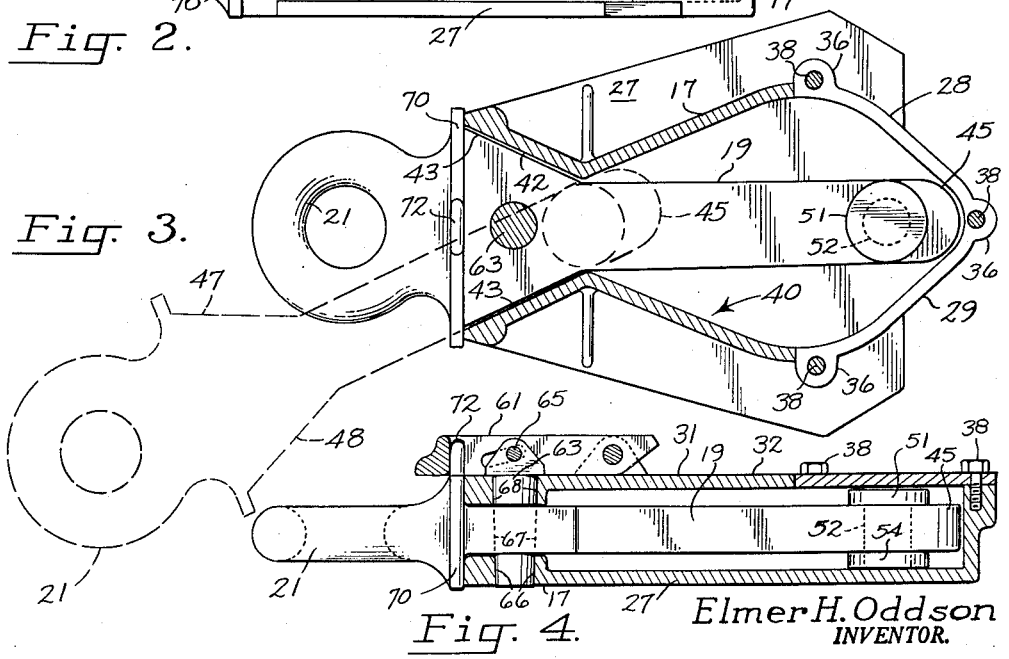
Fig. 3.
Fig. 4.
Elmer H. Oddson
INVENTOR.
BY Ramsey and Kolisch
Attys.

United States Patent Office 2,973,971
Patented Mar. 7, 1961

2,973,971
COUPLING AND ALIGNMENT MECHANISM

Elmer H. Oddson, 13324 NE. Glisan St., Portland 16, Oreg.

Filed Nov. 24, 1958, Ser. No. 775,762

4 Claims. (Cl. 280—478)

This invention relates to mechanism for securing together drawing and drawn vehicles, and more particularly to coupling mechanism which includes means for aligning the tongue member and usual coupler part of the drawn vehicle with the interconnecting coupler part carried at the rear end of the drawing vehicle. The invention has utility in connecting together the usual tractor-trailer combination. The invention is particularly useful for securing together truck-train combinations, where it is desired to attach the rear end of one trailer with the tongue of a succeeding trailer. In such a combination, maneuvering of the first trailer into proper position for attachment with the second trailer is particularly troublesome.

The invention generally is an improvement upon mechanisms illustrated in previously filed applications entitled Coupling Mechanism for Vehicle, Serial No. 678,875, filed August 19, 1957, and Vehicle Coupling Mechanism, Serial No. 639,302, now abandoned, filed February 11, 1957.

In the construction of coupler and alignment mechanism for a pair of vehicles, there are a number of factors which should be considered if satisfactory and practical operation are to result. For instance, the mechanism should be strong and rugged, and capable of withstanding considerable stressing. Trailers frequently carry loads of several thousands of pounds. These loads produce substantial resistance to turning movement in the dirigible wheels of a trailer and the draft tongue connected thereto. A workman, by himself, in most instances is unable to budge the draft tongue of a loaded trailer. Thus the mechanism must stand up under heavy and frequent stressing, without bending or twisting of the parts, and fracturing or rupturing of the parts.

While a rugged construction is mandatory, it is also important that the mechanism be compact and of relatively light mass. Any addition to the weight of a trailer detracts from the pay load which can be carried. If the mechanism is bulky and large, maneuverability is impaired. Further, in some constructions it is difficult to find the space necessary to mount any mechanism of relatively large size.

As another consideration, it is important that the mechanism function properly over long periods of time without constant lubrication or other maintenance. The structure therefor should be devoid of tightly-fitting movable parts which would require frequent greasing, or would have their operation impaired by nicks and abrasions. As a corollary, the mechanism should be so constructed that dirt and other foreign material thrown against the mechanism will not cause damage or reduction in efficient operation. This is particularly important, when it is remembered that the mechanism normally is located adjacent the rear wheels of the drawing vehicle the forward wheels of the drawn vehicle, and these wheels on rotation throw up a considerable amount of material from off a road surface.

A general object of the invention is to provide improved coupling mechanism which takes care of the above discussed requirements in a highly practical and satisfactory manner.

More specifically, it is an object to provide an improved coupler and alignment mechanism which comprises a hollow casing with walls defining an enclosed guide chamber and a passage connecting with the chamber, and a bar member extensible from the casing loosely fitted in said passage and directly in contact with the sides thereof, organized and constructed so that the sides of the passage and chamber function together to produce alignment of the bar when the same is moved to a fully retracted position within the casing.

Other features of the invention comprise a novel means finally for centering an intermediate portion of the bar member, whereby any play of the bar member is taken up after it is finally positioned; a novel means for locking the bar member and casing together when the bar member is fully retracted within the casing and the parts are in transport position; and a novel mechanism for holding the inner end of the bar member within the casing to prevent its complete removal therefrom and separation of the bar member from the casing.

Other objects, advantages and novel features are attained by the invention, which is described hereinbelow in conjunction with the accompanying drawings, wherein:

Fig. 1 is a plan view of the forward end of a trailer tongue showing the draft tongue and coupler alignment mechanism;

Fig. 2 is a side elevation of the trailer tongue portions illustrated in Fig. 1.

Fig. 3 is a section view along the line 3—3 in Fig. 2; and

Fig. 4 is a section view along the line 4—4 in Fig. 1.

Referring now to the drawings for a description of a particular embodiment of this invention, and in particular to Fig. 1, 10 indicates generally the draft tongue of a conventional drawn vehicle, such as a trailer. The draft tongue takes the form of an A-frame, and comprises side members 11, 12 joined together as by transverse brace member 13. The tongue has its rear end connected to the dirigible wheels (not shown) of the drawn vehicle, and shifting of the forward end of the tongue laterally to one side or the other of the longitudinal axis of the trailer operates to steer the trailer in a conventional manner.

Carried at the forward end of the draft tongue, or the left end of the tongue member in Fig. 1, is a coupler and aligning mechanism generally indicated 15. This may be mounted as shown, with the mechanism occupying substantially the plans of draft tongue 10.

Referring now to Figs. 1–4, mechanism 15 comprises a rigid casing 17 and an elongated rod or bar member 19. The forward end of bar member 19 is provided with an eye portion 21, which constitutes a coupler part carried by the draft tongue of the drawn vehicle. The draft tongue may be connected to a drawing vehicle by means of finger 23, which constitutes a coupler part carried by the drawing vehicle. In a conventional construction, finger 23 is pivotable, and loosely holds eye portion 21 against an abutment with the finger swung to and then locked in the position shown in Fig. 1, to produce a draft connection between the drawing and drawn vehicles. The finger and eye coupler parts illustrated are exemplary of various kinds of well-known coupler devices, which may be employed in securing two vehicles together. While such is a common construction, other structures may be employed without departing from this invention, as the particular form of the coupler parts forms no part of this invention.

Casing 17 comprises a flat base plate 27, curved side wall portions 28, 29 joined to base plate 27, and a top wall 31. Wall portion 31 is divided into two parts, a part 32 which is joined to and thus integral with side walls 28, 29, and a separable cover plate or wall portion 33.

Side wall portions 28, 29 are provided with bosses 36, and these have threaded bores extending downwardly therein, which accommodate a set of screws 38. Cover plate 33 is secured to the top of the casing by turning screws 38 into the bores provided in bosses 36.

The casing is secured to tongue 10 as by welding the side edges of base plate 27 to side members 11, 12. Additional rigidity may also be achieved by welding transverse brace member 13 to the rear edge of base plate 27.

It will be noted that in the completed mechanism, side walls 28, 29, top wall 31, and and base plate 27 defined an elongated ovate chamber within the casing, indicated at 40. The chamber is arranged on the A-frame tongue with the major axis of the chamber aligned longitudinally with the A-frame. The chamber is completely enclosed, save for a passage 42 extending through the casing and communicating with the chamber at one of the apices of the chamber along its major axis. Passage 42 is defined by side wall portions 43, which spread laterally from each other progressing to the exterior of the casing from a throat section, indicated at 42a, adjacent chamber 40. These flared or diverging walls constitute part of a closure and a centering means provided in the device.

Bar member 19 in all positions save when fully retracted in the casing is loosely fitted in passage 42, and has one end 45 which is mounted within the chamber 40 and freely movable therein when the bar member is extended from the casing. That is to say, the sides of the bar member adjacent end 45 are spaced closer together than the sides of throat section 42a, so that in all positions save for its fully retracted position the bar member may be swung in a horizontal plane. Fig. 3 illustrates in dotted lines the bar member in an extended position, and it will be noted that in this extended position the bar member may be swung laterally to various angular positions relative to the casing. Retraction of the bar member into the casing serves to swing the bar member into an aligned position with the major axis of chamber 40. Thus, as the bar member proceeds inwardly into the casing from the position shown in dotted lines in Fig. 3, the inner end strikes a converging portion of side wall 28, and this converging wall on continued movement of the bar imparts a force on the bar tending to straighten the same. During this time an intermediate portion of the bar member slides against one of the side walls defining passage 42. This engagement produces a turning torque on the bar member acting in the opposite direction. With the bar member fully retracted in the casing, as shown by the solid lines in Fig. 3, the inner end 45 is received in the convergence of walls 28, 29, which constitutes a pocketing means at the other apex of the chamber.

Intermediate the ends of bar member 19 are flared side wall portions 47, 48. On positioning of the bar member to a fully retracted position in the casing, wall portions 47, 48 fit snugly between laterally spreading portions 43. The flared walls produce final centering of the bar member in the casing, and take up any play in the bar member. Thus, in a fully retracted position, the bar member is substantially fixed from lateral shifting.

Adjacent end 45 is a removable button means, which is included to prevent complete separation of the bar member from the casing. The button means is mounted in place by removing detachable cover plate 33, which presents access to the casing interior. The button means comprises a mushroom-shaped element 51 having a stem 52, which is positioned on the end of the bar member by placing stem 52 in an accommodating bore provided adjacent end 45. The end of stem 52 fits within the cylindrical center opening of an annular collar member 54. The top and bottom surfaces of element 51 and member 54, respectively, slide during extension and retraction of the bar member against top and bottom wall portions of chamber 40.

The bar member is locked securely in the casing using a pin mechanism located adjacent passage 42. The pin mechanism is spaced from end 45, and in this way, when the bar member is locked in position, the bar member is held from lateral shifting by holding means spaced a distance apart along the length of the bar member.

Specifically, pivotally secured to top wall 31 is a bail or lever member 61. The bail member mounts a tapered pin 63, which is connected to the bail member by a pin and slot connection 65. The pin and slot connection accommodates shifting of the tapered pin on pivotal movement of the bail member.

Apertures 66, 67, 68 are provided in the casing and bar member. With the bar member fully retracted, these apertures move into registering position, enabling the pin to move down through the apertures into the locking position shown in Fig. 4. The taper of the pin produces a wedging action.

Bar member 19 is provided with a shield portion 70, which extends normally to the length of the bar member. The shield portion and the flared side walls of the bar member comprise a means sealing off the entrance of passage 42 when the bar member is positioned in the retracted position of Fig. 4.

Projecting from the top of shield portion 70 is a catch 72. With the bail member in the lowered position of Figs. 2 and 4, the bail member drops over the catch. The bail member and catch constitute a second locking means preventing extension of the bar member from the casing.

The bail member is held in the lowered position of Figs. 2 and 4 by a spring-operated lock mechanism, best illustrated in Figs. 1 and 2. Thus, pivotably mounted on the top wall of casing 17 is a locking finger 76. This is biased by a spring 77 to a position wherein one end of the finger 76 lies underneath an end of one of the legs of bail member 61. In this position finger 76 functions to prevent pivotal movement of the bail member. Finger 76 may be swung to the position shown in dotted lines in Fig. 1, and this acts to free the bail member.

The construction described has several outstanding features. The casing 17 is comprised of substantially continuous top, bottom and side walls and as a result has high rigidity in proportion to its mass. The casing can take shocks and severe stressing, such as are common during hitching of a trailer, without fracture or deformation. The compact construction of the casing enables it to be mounted readily at the forward end of the usual trailer draft tongue.

The aligning bar member 19 has its rear end always fully covered by the walls of the casing. In the retracted position, the forward end of chamber 40 is closed off, and during these times the chamber is completely closed. This prevents foreign matter such as dirt, etc., from entering the casing, and the protection is maximum during transport conditions.

The bar member is loosely threaded through passage 42 leading to the casing interior. The loose fit means that little or no lubrication is necessary. Any lubricant that is applied tends to remain deposited on the bearing surfaces without becoming wiped off.

It is also important that casing 17 and bar member 19 form a convenient package which may be incorporated with existing draft tongues with a minimum amount of labor and expense. This is to be compared with constructions where new or substantially rebuilt draft tongues must be used.

I claim:

1. For a vehicle train having drawing and drawn vehicles, a draft tongue and coupler alignment mechanism for connecting adjacent ends of the vehicles comprising, in operative position, a hollow casing mounted on one of said vehicles having continuous top, bottom, and side walls joined together and defining an elongated chamber within the casing aligned longitudinally with said one vehicle, a passage connecting with the one of the pair of ends of the chamber nearer the other of said vehicles and leading from the chamber to the exterior of the casing, an elongated bar member loosely threaded through said passage having one end within and engageable with the side walls defining the chamber and its other end outside said casing and connected to said other vehicle, the side walls defining said chamber laterally diverging from each other at the one of the pair of ends of the chamber farther from said other vehicle and defining pocketing means for snugly receiving said one end of said bar member, a pin-receiving aperture formed in said casing connecting with said passage, a pin-receiving aperture formed in said bar member movable into registry with said first-mentioned aperture when said one end of said bar member is snugly received by said pocketing means, a removable pin operable to lock together the bar member and casing when inserted through both of said apertures, catch means joined to said bar member, lever means pivoted to said casing positionable over said catch means and operable when so positioned to prevent extension of said bar member from said casing, and means mounting said removable pin on said lever means.

2. For a vehicle train having drawing and drawn vehicles, a draft tongue and coupler alignment mechanism for connecting adjacent ends of the vehicles comprising, in operative position, a hollow casing mounted on one of said vehicles having walls defining an enclosed horizontally disposed chamber substantially ovate in plan and having a major axis extending longitudinally of said one vehicle, said chamber having an apex at each end of its major axis, a passage extending through said casing and connecting with said chamber at the one of the pair of apices of said chamber nearer the other of said vehicles, said passage having sides defining a throat adjacent said chamber and that spread laterally outwardly progressing from said throat to the outside of said casing, an elongated bar member slidable lengthwise on the sides of said passage extending through said passage and with one end inside said chamber and one end outside said chamber and connected to said other vehicle, said bar member being movable between a retracted position wherein its said one end is fitted snugly within the one of the pair of apices farther from said other vehicle and an extended position wherein its said one end is adjacent said passage, said bar member having side portions intermediate its ends that are flared and shaped to fit snugly within the laterally spreading sides of said passage, said side portions of the bar member being spaced from its said one end a distance equal to the spacing between the laterally spreading sides of said passage and said apex that is farther from said other vehicle so that a snug fit is produced only on the bar member reaching its retracted position, said bar member having side portions extending between its flared side portions and its said one end that are spaced closer together than the sides defining said throat so as to enable the bar member to be turned in said passage in a horizontal plane to bring its said one end into sliding contact with walls defining the sides of said chamber when the bar member is away from its retracted position, and means for locking together the bar member and casing with the bar member in its retracted position.

3. For a vehicle train having drawing and drawn vehicles, a draft tongue and coupler alignment mechanism for connecting adjacent ends of the vehicles comprising, in operative position, a hollow casing mounted on one of said vehicles having walls defining an elongated substantially horizontal chamber within the casing extending longitudinally of said one vehicle, said chamber having lateral sides that first diverge and then converge progressing from the one of the pair of ends of the chamber nearer the other of said vehicles toward the opposite end of the chamber and that define at said opposite end of the chamber a pocketing means, a passage extending through said casing and connecting with said chamber at the end that is nearer said other vehicles, said passage having sides defining a throat adjacent said chamber and that spread laterally outwardly progressing from said throat to the outside of said casing, an elongated bar member slidable lengthwise on the sides of said passage extending through said passage with one end inside said chamber and one end outside said chamber and connected to said other vehicle, said bar member being movable between a retracted position wherein said one end is fitted snugly within said pocketing means and an extended position wherein said one end is adjacent said passage, said bar member having sides along that portion thereof which passes through said throat on movement between extended and retracted positions that are spaced closer together than the sides defining the throat whereby the bar member may be turned in said passage in a horizontal plane to bring its said one end into sliding contact with the lateral sides of said chamber in positions for the bar member away from its retracted position, and means on the bar member shaped to fit snugly within the laterally spreading sides of said passage, the latter means being spaced from said one end of the bar member a distance equal to the spacing between the laterally spreading sides of the passage and said pocketing means so that a snug fit is produced only on the bar member reaching its retracted position and means for locking together the bar member and casing with the bar member in its retracted position.

4. The mechanism of claim 3 wherein the means for locking together the bar member and casing comprises a removable pin, and apertures in said casing and bar member that move into registry with the bar member in its retracted position and that in a registering position are shaped to receive tightly the pin, the aperture in said casing connecting with the passage receiving the bar member.

References Cited in the file of this patent

UNITED STATES PATENTS

| | | |
|---|---|---|
| 2,820,649 | Demarest | Jan. 21, 1958 |
| 2,918,310 | Carson | Dec. 22, 1959 |

FOREIGN PATENTS

| | | |
|---|---|---|
| 661,773 | Germany | June 27, 1938 |
| 586,883 | Great Britain | Apr. 3, 1947 |